March 31, 1964 U. OPRECHT 3,126,703
GAS TURBINE POWER PLANT WITH ROTARY FUEL ATOMIZATION
AND ANNULAR COMBUSTION CHAMBER
Filed Dec. 19, 1960
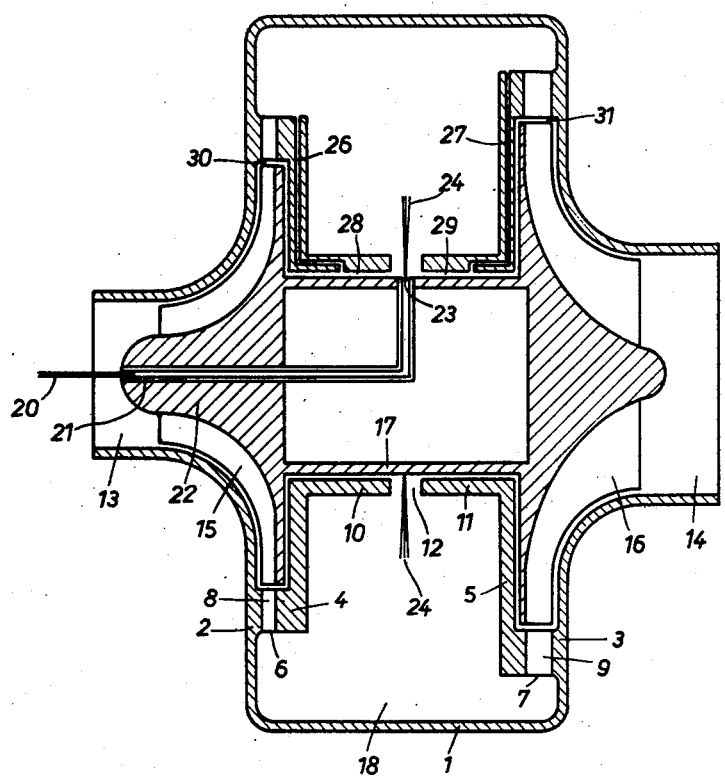
INVENTOR
ULRICH OPRECHT 3,126,703
GAS TURBINE POWER PLANT WITH ROTARY FUEL ATOMIZATION AND ANNULAR COMBUSTION CHAMBER
Ulrich Oprecht, Wittenbach, St. Gall, Switzerland, assignor to Adolph Saurer Ltd., Arbon, Switzerland
Filed Dec. 19, 1960, Ser. No. 76,814
Claims priority, application Switzerland Dec. 24, 1959
3 Claims. (Cl. 60—39.36)

This invention relates to gas turbine power plants, and more particularly to gas turbine power plants of the type provided for rotary atomization in an annular combustion chamber.

It is a primary object of the present invention to provide a gas turbine power plant of the above-noted kind which is materially improved by comparison with existing turbo assemblies in this category.

It is another object of the invention to provide a gas turbine power plant distinguished by compactness and relative simplicity of design, yet outstanding performance.

Other objects, and the manner in which the same are attained, will become apparent as this specification proceeds.

The invention contemplates a gas turbine power plant wherein the compressor and turbine rotors are arranged in overhung relationship on an air-lubricated journal provided in the turbine housing so the ends of both the compressor rotor and the turbine rotor are free floating, while the combustion chamber is disposed concentric to the journal, between the two rotors. Preferably, the bearing enclosing the journal is split in axial direction, and the journal is radially perforated by at least one bore, through which fuel is conveyed into the combustion chamber, the axis of said bore coinciding with the center line of the annular space formed by the divided parts of the split bearing. The bearing is divided, preferably, in a manner such that two bearing halves of approximately equal length are provided, which are mounted on the housing for the compressor and turbine assembly, by means of brackets and fins. The split bearing is supplied with lubricating air derived from the compressor exit whereby the need for conduits for supplying lubricant from the outside, is effectively eliminated.

In the drawing accompanying this application and forming part thereof, an embodiment of the invention is illustrated diagrammatically by way of example.

The sole figure of the drawing is a sectional side view of a housing-enclosed compressor and turbine assembly according to the invention.

Referring to the drawing, the gas turbine housing 1 mounts, on its side walls 2 and 3, the brackets 4 and 5 which extend inside the housing. Fins 6 and 7 connect the brackets 4 and 5 with the side walls 2 and 3. Between individual fins 6 and 7 which are provided on the periphery of the side walls 2 and 3, channels 8 and 9 are disposed. These channels 8 and 9 connect the compressor exit 30 and the turbine inlet 31, respectively, with the combustion chamber 18. The brackets 4 and 5 extend symmetrically toward the interior of casing 1, where they form the mutually aligned bearing halves 10 and 11, respectively. The sleeve-like bearing sections 10 and 11 are spaced from one another in axial direction to define an annular slot 12. Air or other gaseous medium enters the compressor at 13, while the turbine outlet is shown at 14. The compressor wheel 15 and the turbine wheel 16 are interconnected by the journal or shaft 17, which is supported for floating rotation, in the sections 10 and 11 of the split bearing. The wheel 15 of the blower, and the wheel 16 of the turbine, in the arrangement illustrated in the drawing, are of a radial flow design, but the invention is equally adaptable to compressor and turbine assemblies designed for axial or mixed flow. The combustion chamber 18 is disposed between the blower wheel 15 and the turbine wheel 16, in concentric relationship to the journal or shaft 17.

The fuel supply conduit 20 extends from the exterior through an axial bore traversing the hub 22 of the blower wheel 15, to the radial bore provided in the journal or shaft 17. When the turbine plant is operating, the fuel is admitted through the passage defined by conduit 20 and bore 23, and is injected, through the annular slot 12, in the form of a disk-shaped veil, indicated at 24, into the combustion chamber 18. The fuel supply conduit 20 need not be disposed along the axis of the journal or shaft 17; for example, if the journal or shaft is hollow, it could extend in the wall thereof and terminate in a hole corresponding to the terminal portion of the bore 23, from where the fuel would be injected through the annular slot 12 into the combustion chamber 18, in the same manner as described above with reference to the arrangement illustrated in the drawing.

The compressor exit 30 is tapped (in some suitable manner not illustrated in the drawing) to supply air for lubricating the split bearing 10, 11. Through bores 26 and 27 provided in the brackets 4 and 5, respectively, the lubricating air or other gaseous medium enters the bearing slots 28 and 29 extending between the journal or shaft 17 and the bearing sections 10 and 11, respectively. Once it has traversed the bearing slots 28 and 29, part of the lubricating air enters through the annular slot 12, the combustion chamber 18 while the remainder escapes into the space located in the immediate proximity to the blower exit 30, or into the space in front of the turbine inlet 31, where the pressure is known to be sufficiently low for conveying the lubricating air.

I wish it to be understood that I do not desire to be limited to the details of construction, design and operation shown and described, as modifications within the scope of the following claims and involving no departure from the spirit of the invention nor any sacrifice of the advantages thereof, may occur to workers in the field.

I claim:

1. A gas turbine power plant of the annular combustion chamber, rotary fuel atomization type, comprising in combination, a housing, a bearing split once in axial direction, mounted in this housing, an air lubricated shaft arranged for rotation in said bearing, compressor and turbine rotors arranged in overhung relationship on said shaft so as to have free floating ends, a compressor exit, means for supplying lubricating air from the compressor exit to the shaft, said annular combustion chamber being disposed in concentric relationship to said shaft, between the said compressor and turbine rotors, an axial bore and at least one radial bore communicating with said axial bore provided in said shaft, the parts of said split bearing being spaced from one another in axial direction to define an annular slot therebetween, the axis of said radial bore in said shaft coinciding with the center line of the said annular slot, and means for feeding fuel through said axial bore, said radial bore and said annular slot into said combustion chamber.

2. A gas turbine power plant of the annular combustion chamber, rotary fuel atomization type, comprising in combination, a housing, a bearing split once in axial direction, mounted in this housing, an air lubricated shaft arranged for rotation in said bearing, compressor and turbine rotors arranged in overhung relationship on said shaft so as to have free floating ends, a compressor exit, means for supplying lubricating air from the compressor exit to the shaft, said annular combustion chamber being disposed in concentric relationship to said shaft, between the said compressor and turbine rotors, an axial bore and at least one radial bore communicating with said axial bore provided in said shaft, the parts of said split bearing being spaced from one another in axial direction to define an annular slot therebetween, the axis of said radial bore in said shaft coinciding with the center line of the said annular slot, and means for feeding fuel through said axial bore, said radial bore and said annular slot into said combustion chamber, the parts of the said split bearing having substantially equal length.

3. A gas turbine power plant of the annular combustion chamber, rotary fuel atomization type, comprising in combination, a housing, a bearing split once in axial direction, mounted in this housing, an air lubricated shaft arranged for rotation in said bearing, compressor and turbine rotors arranged in overhung relationship on said shaft so as to have free floating ends, a compressor exit, means for supplying lubricating air from the compressor exit to the shaft, said annular combustion chamber being disposed in concentric relationship to said shaft, between the said compressor and turbine rotors, an axial bore and at least one radial bore communicating with said axial bore provided in said shaft, the parts of said split bearing being spaced from one another in axial direction to define an annular slot therebetween, the axis of said radial bore in said shaft coinciding with the center line of the said annular slot, and means for feeding fuel through said axial bore, said radial bore and said annular slot into said combustion chamber, brackets for mounting the parts of said split bearing in said housing, said means for supplying lubricating air from the compressor exit to the shaft comprising bores provided in said brackets.

References Cited in the file of this patent

UNITED STATES PATENTS

| | | |
|---|---|---|
| 2,695,198 | Brugger | Nov. 23, 1954 |
| 2,720,750 | Schelp | Oct. 18, 1955 |
| 2,856,755 | Szydlowski | Oct. 21, 1958 |
| 2,864,552 | Anderson | Dec. 16, 1958 |
| 2,907,527 | Cummings | Oct. 6, 1959 |
| 2,924,937 | Leibach | Feb. 16, 1960 |
| 2,929,548 | Crooks et al. | Mar. 22, 1960 |